(12) United States Patent
Mita et al.

(10) Patent No.: US 11,448,337 B2
(45) Date of Patent: Sep. 20, 2022

(54) SOLENOID VALVE

(71) Applicant: SMC CORPORATION, Chiyoda-ku (JP)

(72) Inventors: Minehiko Mita, Joso (JP); Masaki Morimoto, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/287,291

(22) PCT Filed: Oct. 11, 2019

(86) PCT No.: PCT/JP2019/040144
§ 371 (c)(1),
(2) Date: Apr. 21, 2021

(87) PCT Pub. No.: WO2020/090414
PCT Pub. Date: May 7, 2020

(65) Prior Publication Data
US 2021/0396329 A1 Dec. 23, 2021

(30) Foreign Application Priority Data

Oct. 31, 2018 (JP) .............................. JP2018-205989

(51) Int. Cl.
*F16K 31/06* (2006.01)
*H01F 7/08* (2006.01)

(52) U.S. Cl.
CPC ......... *F16K 31/0675* (2013.01); *H01F 7/081* (2013.01)

(58) Field of Classification Search
CPC ...... F16K 27/003; F16K 27/029; F16K 31/06; F16K 31/0624; F16K 31/0675; H01F 7/081; H01F 7/127; H01F 7/16; H01F 2007/083
See application file for complete search history.

(56) References Cited

U.S. PATENT DOCUMENTS 7,004,450 B2 * 2/2006 Yoshimura .............. H01F 7/081
335/278
7,954,786 B2 * 6/2011 Narita ................. F16K 31/0627
310/71

(Continued)

FOREIGN PATENT DOCUMENTS

JP 1-44867 Y2 12/1989
JP 2-15099 Y2 4/1990

(Continued)

OTHER PUBLICATIONS

International Search Report dated Dec. 24, 2019 in PCT/JP2019/040144 filed Oct. 11, 2019, 2 pages.

*Primary Examiner* — Matthew W Jellett
(74) *Attorney, Agent, or Firm* — Oblon, McClelland, Maier & Neustadt, L.L.P.

(57) ABSTRACT

Latch protrusions of an upper surface wall are latched into latch recesses of a first front-surface half wall and an upper end portion of a second front-surface half wall of a magnetic cover, and latch protrusions of the upper surface wall are latched into latch recesses of a first rear-surface half wall and an upper end portion of a second rear-surface half wall of the magnetic cover. Hook portions of the first front-surface half wall and a lower end portion of the second front-surface half wall are folded into a coupling groove of the valve body, and hook portions of the first rear-surface half wall and a lower end portion of the second rear-surface half wall are folded into a coupling groove of the valve body.

4 Claims, 7 Drawing Sheets

(56) References Cited

U.S. PATENT DOCUMENTS

| | | | |
|---|---|---|---|
| 10,024,448 B2* | 7/2018 | Watanabe | H01F 27/24 |
| 10,746,316 B2* | 8/2020 | Yoshimura | F16K 31/06 |
| 11,092,259 B2* | 8/2021 | Meissgeier | H01F 7/081 |
| 2004/0051069 A1* | 3/2004 | Miyazoe | H01F 5/04 |
| | | | 251/129.15 |
| 2005/0253104 A1* | 11/2005 | Sato | F16K 31/0627 |
| | | | 251/129.19 |
| 2006/0108551 A1 | 5/2006 | Yoshimura et al. | |
| 2012/0292544 A1 | 11/2012 | Mita et al. | |
| 2019/0154166 A1 | 5/2019 | Yoshimura et al. | |
| 2021/0332909 A1* | 10/2021 | Yoshimura | F16K 31/0624 |

FOREIGN PATENT DOCUMENTS

| | | |
|---|---|---|
| JP | 2006-145007 A | 6/2006 |
| JP | 2010-71359 A | 4/2010 |
| JP | 2011-171447 A | 9/2011 |
| JP | 2017-207158 A | 11/2017 |
| WO | WO 2008/080860 A1 | 7/2008 |

* cited by examiner

SOLENOID VALVE

TECHNICAL FIELD

The present invention relates to a solenoid valve that includes a main valve unit and an electromagnetic operation unit, and more particularly, to a solenoid valve in which the electromagnetic operation unit is covered with a magnetic cover.

BACKGROUND ART

A solenoid valve that includes a main valve unit and an electromagnetic operation unit is commonly known as described in PTL 1 to PTL 5. In this type of solenoid valve, the main valve unit includes a valve body having a plurality of ports and a valve member that opens and closes a flow path connecting the ports, and the electromagnetic operation unit is formed by arranging, in a magnetic cover having a quadrangular box shape, an electromagnetic coil, a stationary core that generates a magnetic force as a result of the electromagnetic coil being energized, and a movable core that causes, by being attracted to the stationary core and separated from the stationary core, the valve member to perform opening and closing operations.

In the solenoid valve, the magnetic cover of the electromagnetic operation unit guides a magnetic flux that is generated when the electromagnetic coil is energized to the stationary core and the movable core and forms a portion of a magnetic circuit. The magnetic efficiency of the magnetic cover can be improved by forming the magnetic cover into a box shape and covering the entire electromagnetic operation unit with the magnetic cover.

When the magnetic cover is formed, in the related art, a method of shaping a metal plate into a box shape by deep drawing as disclosed in PTL 1 and PTL 2 or a method of shaping a metal plate into a frame shape, a box shape, or the like by punching the metal plate into a predetermined shape and then bending the punched metal plate as disclosed in PTL 3 to PTL 5 has been used.

Among these methods, the method using deep drawing can obtain a magnetic cover with a stable shape. However, this method requires a high degree of forming technology and high manufacturing costs.

In contrast, the method of bending a metal plate has simpler steps compared with deep drawing, and the manufacturing costs are lower. Thus, it is desired to form the magnetic cover by such a method of bending a metal plate.

However, a magnetic cover formed by bending a metal plate has a joint portion of the metal plate, and thus, there is a problem in that a gap is likely to be formed at the joint portion due to springback of the bent metal plate. If a gap is formed at the joint portion, the shape of the magnetic cover becomes unstable, which adversely affects the assembly of the solenoid valve. In addition, there is a possibility that the magnetic reluctance may increase and that the magnetic efficiency may decrease.

CITATION LIST

Patent Literature

PTL 1: Japanese Unexamined Patent Application Publication No. 2006-145007
PTL 2: Japanese Unexamined Patent Application Publication No. 2011-171447
PTL 3: Japanese Examined Utility Model Registration Application Publication No. 1-44867
PTL 4: Japanese Examined Utility Model Registration Application Publication No. 2-15099
PTL 5: Japanese Unexamined Patent Application Publication No. 2017-207158

SUMMARY OF INVENTION

Technical Problem

It is a technical object of the present invention to stabilize the shape of a magnetic cover so as to facilitate assembly of a solenoid valve by preventing, when the magnetic cover is formed by bending a metal plate and incorporated into the solenoid valve, the metal plate from opening at its joint portion in such a manner as to form a gap and to prevent a decrease in the magnetic efficiency due to an increase in the magnetic reluctance.

Solution to Problem

In order to solve the above problem, according to the present invention, a solenoid valve formed by coupling a main valve unit that includes a valve member movable to open and close a flow path and an electromagnetic operation unit that causes, by using an electromagnetic force, the valve member to perform opening and closing operations to each other.

The main valve unit of the solenoid valve includes a valve body in which the valve member is disposed, and the valve body includes a coupling portion for coupling the electromagnetic operation unit, the coupling portion having a front surface in which a coupling groove is formed and a rear surface in which a coupling groove is formed.

In contrast, the electromagnetic operation unit includes a magnetic cover that has a quadrangular box shape and that covers the electromagnetic operation unit. The magnetic cover has a rectangular upper surface wall, a rectangular front surface wall, a rectangular rear surface wall, a rectangular left surface wall, and a rectangular right surface wall, and the upper surface wall, the front surface wall, the rear surface wall, the left surface wall, and the right surface wall are integrally formed by bending a single metal plate.

A lower surface of the magnetic cover is open, and the coupling portion of the valve body is fitted into the magnetic cover through the lower surface. The front surface wall of the magnetic cover is formed by bringing a rectangular first front-surface half wall that is integrally contiguous to a front end of the left surface wall and a rectangular second front-surface half wall that is integrally contiguous to a front end of the right surface wall into contact with each other at a joint, and the rear surface wall is formed by bringing a rectangular first rear-surface half wall that is integrally contiguous to a rear end of the left surface wall and a rectangular second rear-surface half wall that is integrally contiguous to a rear end of the right surface wall into contact with each other at a joint.

Latch recesses or latch protrusions that are formed in or on an upper end portion of the first front-surface half wall and an upper end portion of the second front-surface half wall and latch protrusions or latch recesses that are formed on or in a front end portion of the upper surface wall are latched together at a front ridge portion at which the upper surface wall and the front surface wall are in contact with each other, and latch recesses or latch protrusions that are formed in or on an upper end portion of the first rear-surface half wall and an upper end portion of the second rear-surface half wall and latch protrusions or latch recesses that are formed on or in a rear end portion of the upper surface wall are latched together at a rear ridge portion at which the upper surface wall and the rear surface wall are in contact with each other.

In a lower end portion of the magnetic cover, hook portions for engagement are formed on a lower end portion of the first front-surface half wall and a lower end portion of the second front-surface half wall of the front surface wall in such a manner as to be contiguous to each other via the corresponding joint, and hook portions for engagement are formed on a lower end portion of the first rear-surface half wall and a lower end portion of the second rear-surface half wall of the rear surface wall in such a manner as to be contiguous to each other via the corresponding joint. The hook portions are folded and engaged into the coupling grooves formed in the coupling portion of the valve body such that the main valve unit and the electromagnetic operation unit are coupled to each other.

In the present invention, the coupling groove formed in the front surface of the coupling portion of the valve body has an engagement wall extending in a transverse direction of the valve body across the joint of the front surface wall and left and right side walls, and the coupling groove formed in the rear surface of the coupling portion of the valve body has an engagement wall extending in the transverse direction of the valve body across the joint of the rear surface wall and left and right side walls, the left and right side walls of each of the coupling grooves being gradually inclined in a depth direction the coupling groove and in a direction in which a gap between the left and right side walls becomes narrower. The magnetic cover and the valve body are coupled to each other by engaging the hook portions with the engagement walls of the coupling grooves. The hook portions of the first front-surface half wall and the second front-surface half wall are brought into contact with the left and right side walls of the coupling groove of the front surface, so that the first front-surface half wall and the second front-surface half wall are pressed in a direction in which the corresponding joint is closed, and the hook portions of the first rear-surface half wall and the second rear-surface half wall are brought into contact with the left and right side walls of the coupling groove of the rear surface, so that the first rear-surface half wall and the second rear-surface half wall are pressed in a direction in which the corresponding joint is closed.

In addition, in the present invention, it is desirable that the latch recesses be formed in the upper end portion of the first front-surface half wall, the upper end portion of the second front-surface half wall, the upper end portion of the first rear-surface half wall, and the upper end portion of the second rear-surface half wall in such a manner that the latch recesses formed in the first front-surface half wall and the second front-surface half wall are arranged at positions that do not intersect the corresponding joint and that the latch recesses formed in the first rear-surface half wall and the second rear-surface half wall are arranged at positions that do not intersect the corresponding joint, and it is desirable that the latch protrusions be formed on the front end portion and the rear end portion of the upper surface wall.

Furthermore, in the present invention, the first front-surface half wall and the second front-surface half wall forming the front surface wall of the magnetic cover may be coupled to each other at the corresponding joint by engaging a dovetail formed on one of the front-surface half walls and a dovetail groove formed in another one of the front-surface half walls with each other, and the first rear-surface half wall and the second rear-surface half wall forming the rear surface wall of the magnetic cover may be coupled to each other at the corresponding joint by engaging a dovetail formed on one of the rear-surface half walls and a dovetail groove formed in another one of the rear-surface half walls with each other.

Advantageous Effects of Invention

According to the present invention, even if a magnetic cover is formed by bending a metal plate, a joint of the metal plate can be reliably prevented from opening so as to form a gap by suppressing springback of the metal plate. As a result, a stable box shape can be maintained, and a decrease in the magnetic efficiency due to an increase in the magnetic reluctance can be prevented.

DESCRIPTION OF EMBODIMENTS

Figure 1:
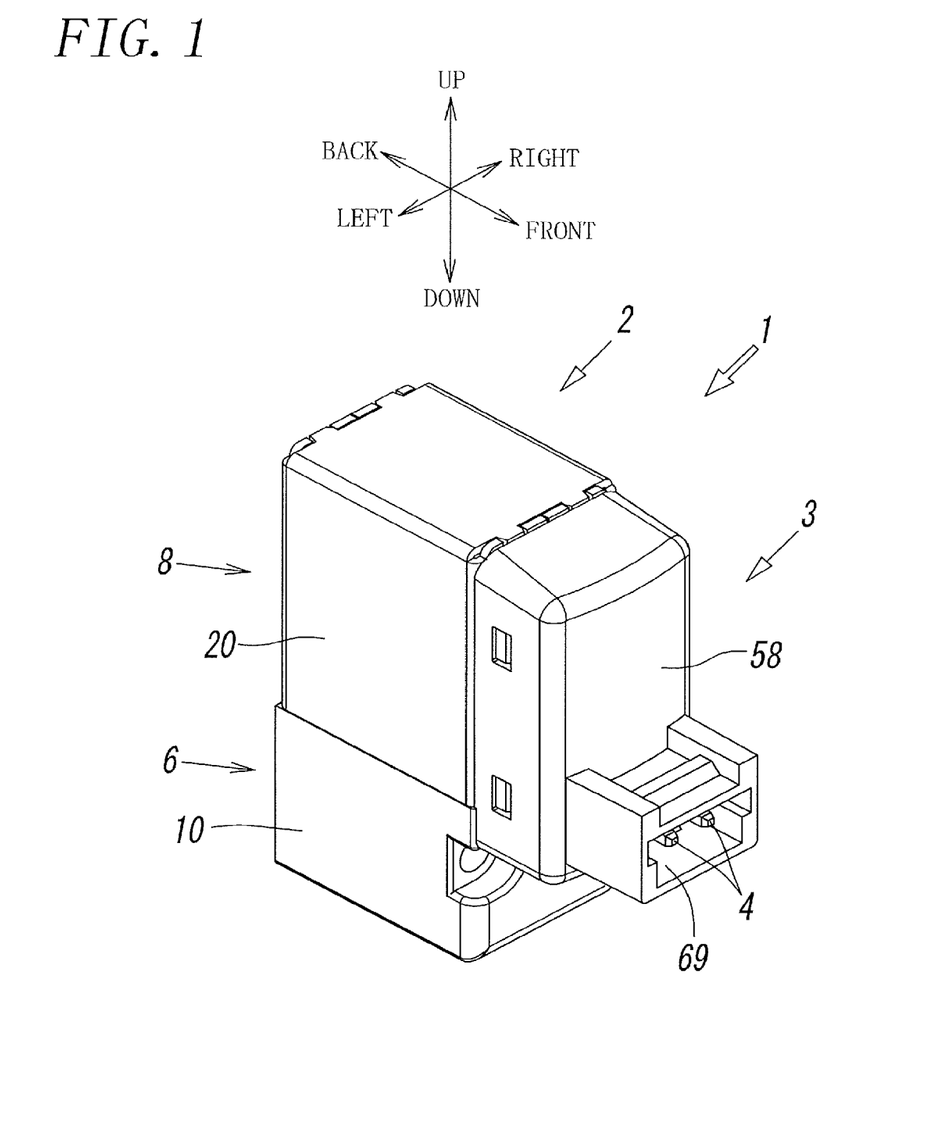
FIG. 1 is a perspective view illustrating a first embodiment of a solenoid valve according to the present invention.
Figure 2:
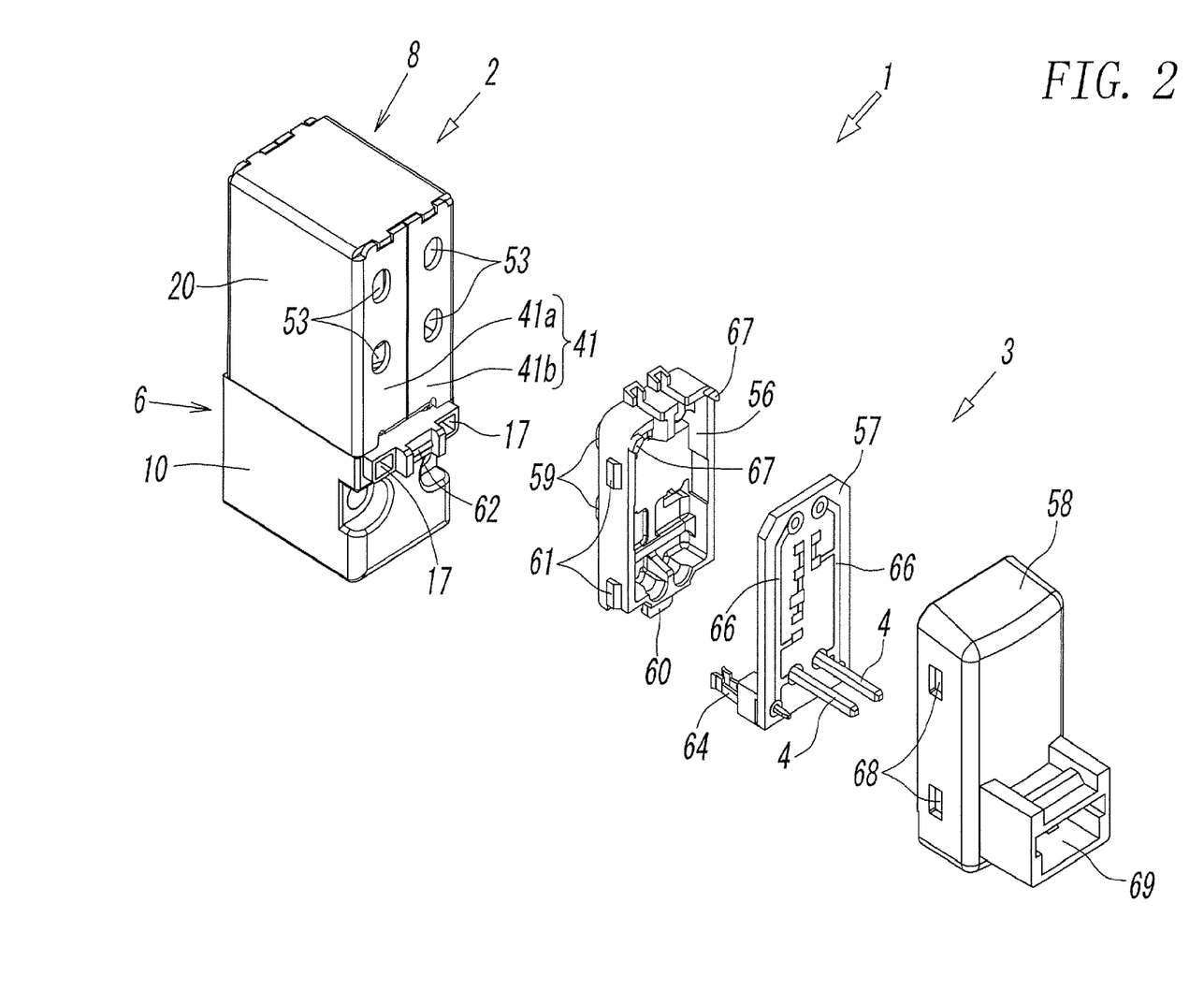
FIG. 2 is a perspective view illustrating, in an exploded manner, a portion of the solenoid valve illustrated in FIG. 1.
Figure 3:
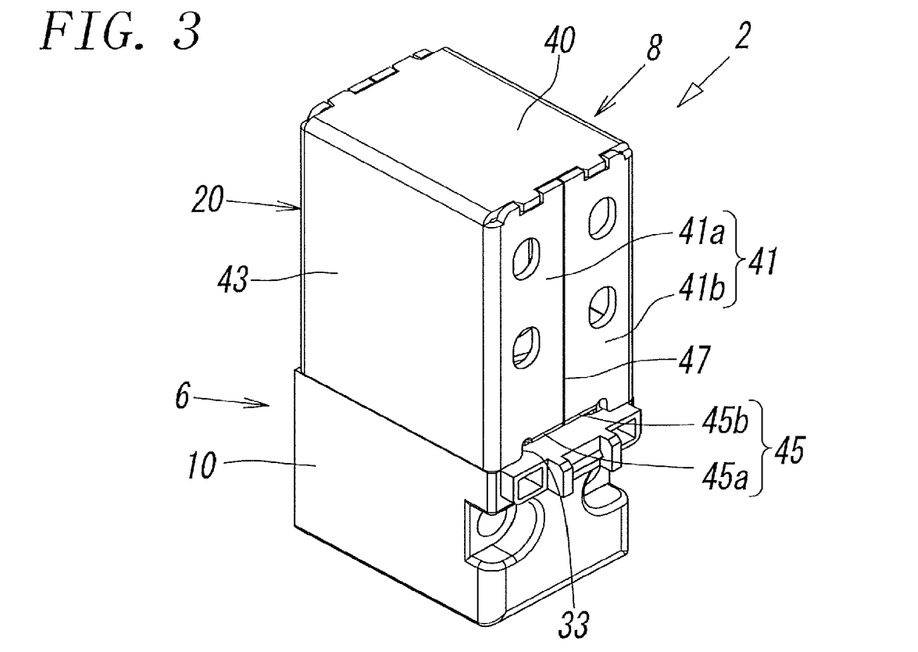
FIG. 3 is a perspective view of a solenoid-valve main body as viewed from a front surface side.
Figure 4:
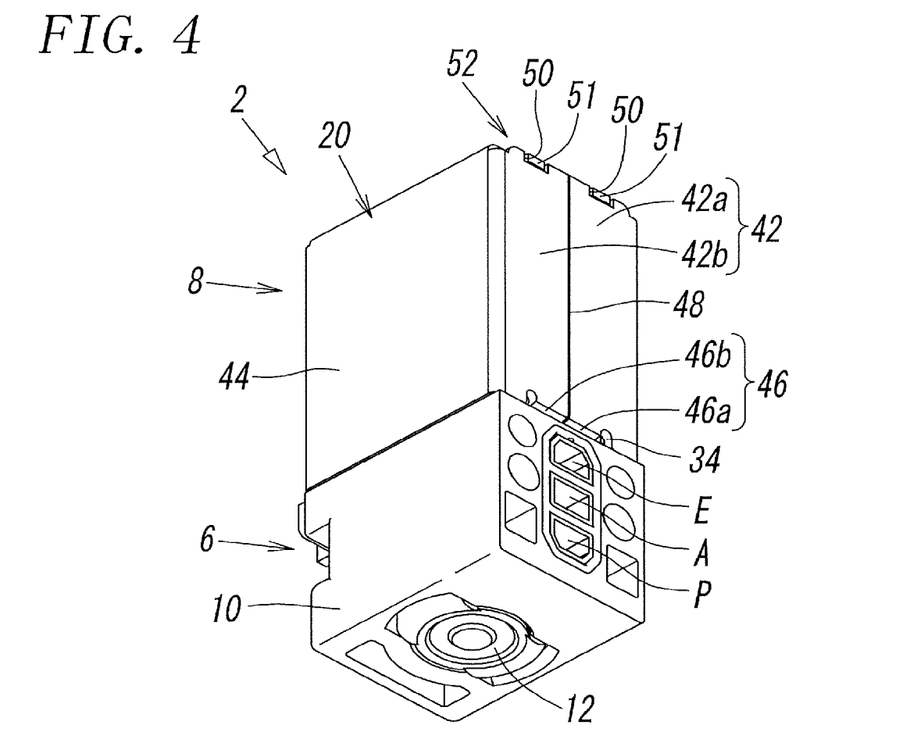
FIG. 4 is a perspective view of the solenoid-valve main body as viewed from a rear surface side.

FIG. 1 is a perspective view of a solenoid valve according to the present invention, and as illustrated in FIG. 2, a solenoid valve 1 includes a solenoid-valve main body 2 and an electric connecting unit 3 that includes a pair of connection terminals 4 and 4 to which a lead wire extending from a control device is connected.

Note that, in the following description, frontward and rearward directions, leftward and rightward directions, and upward and downward directions of the solenoid valve 1 are defined as the directions indicated by arrows in FIG. 1.

As illustrated in FIG. 3 to FIG. 6, the solenoid-valve main body 2 includes a main valve unit 6 that includes a valve member 7 movable to open and close a flow path and an electromagnetic operation unit 8 that causes, by using an electromagnetic force, the valve member 7 to perform opening and closing operations, and the electromagnetic operation unit 8 and the main valve unit 6 are coupled to each other along an axis L.

The main valve unit 6 includes a valve body 10 that has a quadrangular block shape and that is made of a non-magnetic material such as an aluminum alloy. An input port P, an output port A, and a discharge port E are formed in the rear surface of the valve body 10. A circular valve chamber 11 is formed in the valve body 10 so as to communicate with each of the above-mentioned ports P, A, and E, and the valve member 7 is accommodated in the valve chamber 11. The valve chamber 11 is partitioned by an orifice 12 that is attached to a lower end portion of the valve body 10 with seal members 13a and 13b interposed therebetween, and the axis L passes through the center of the valve chamber 11.

The input port P communicates with the valve chamber 11 through an input opening Po that is open upward at an upper end portion of the orifice 12. The discharge port E communicates with the valve chamber 11 through a discharge opening Eo that is open downward at an upper end wall of the valve chamber 11. The output port A communicates with the valve chamber 11 through an output opening Ao that is open at a position between the input opening Po and the discharge opening Eo to a side wall of the valve chamber 11. The input opening Po and the discharge opening Eo are arranged at positions on the axis L so as to face each other, and the valve member 7 is disposed between the input opening Po and the discharge opening Eo.

Figure 5:
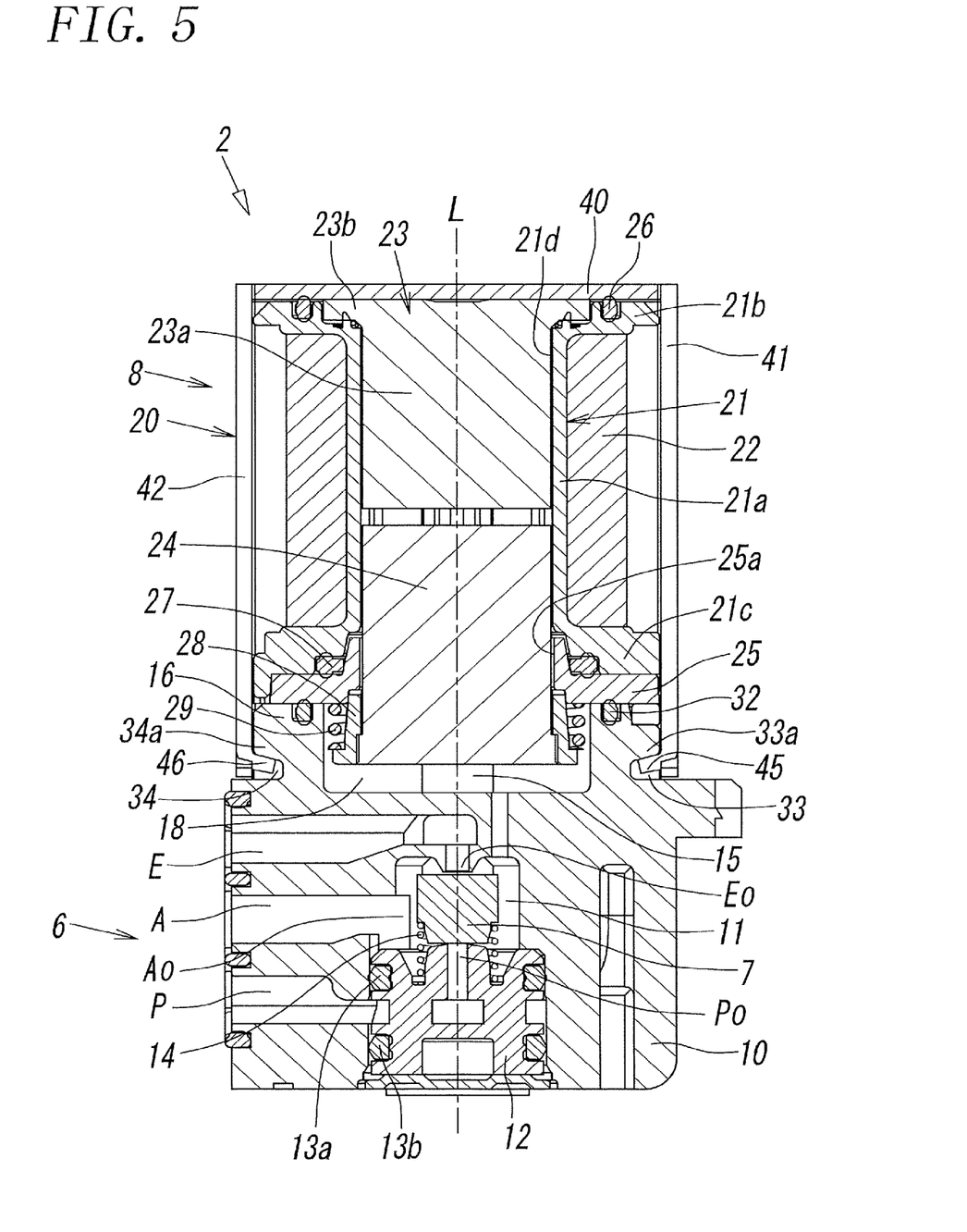
FIG. 5 is a central longitudinal sectional view illustrating a central cross-section of the solenoid-valve main body in a transverse direction.

The valve member 7 is a member that has a columnar shape and that is made of an elastic material such as rubber or a synthetic rubber and is accommodated in the valve chamber 11 so as to be capable of being freely displaced in the vertical direction. The valve member 7 is urged upward by a valve spring 14, which is disposed between the valve member 7 and the orifice 12, and coupled to a movable core 24 of the electromagnetic operation unit 8 via a pair of push rods 15 that are arranged so as to face each other with the axis L interposed therebetween. When the valve member 7 is pushed down by the push rods 15 as a result of the movable core 24 moving downward, as illustrated in FIG. 5, the input opening Po is closed, and the discharge opening Eo is opened. As a result, the input port P is blocked, and the output port A and the discharge port E communicate with each other. When the movable core 24 moves upward, the valve member 7 is moved upward by a spring force of the valve spring 14, and the input opening Po is opened while the discharge opening Eo is closed. Accordingly, the input port P and the output port A communicate with each other, and the discharge port E is blocked.

A coupling portion 16 having a substantially rectangular shape in plan view is formed on an upper end portion of the valve body 10 so as to couple the main valve unit 6 and the electromagnetic operation unit 8 to each other. The coupling portion 16 is fitted into a magnetic cover 20 covering the electromagnetic operation unit 8 from a lower end portion of the magnetic cover 20, and the lower end portion of the magnetic cover 20 is engaged with the coupling portion 16, so that the main valve unit 6 and the electromagnetic operation unit 8 are coupled to each other. Details of this coupling structure will be described later.

The electromagnetic operation unit 8 is formed by arranging, in the magnetic cover 20 having a quadrangular box shape, a hollow bobbin 21 around which an electromagnetic coil 22 is wound, a stationary core 23 that generates a magnetic force as a result of the electromagnetic coil 22 being energized, the movable core 24 that causes, by being attracted to the stationary core 23 and separated from the stationary core 23, the valve member 7 to perform the opening and closing operations, and a magnetic plate 25 that magnetically couples the movable core 24 and the magnetic cover 20 to each other.

The bobbin 21 is made of a non-magnetic material such as a synthetic resin and includes a trunk portion 21a that has an oval transverse cross-sectional shape and around which the electromagnetic coil 22 is wound and flange portions 21b and 21c that are respectively formed at the upper end and the lower end of the trunk portion 21a and each of which has an oval shape in plan view, and a central hole 21d that has an oval transverse cross-sectional shape is formed in the bobbin 21 so as to extend along the axis L.

The bobbin 21 is disposed in the magnetic cover 20 in such a manner that the flange portion (upper flange) 21b that is formed at the upper end of the trunk portion 21a is in contact with the inner surface of an upper surface wall 40 of the magnetic cover 20 and that the flange portion (lower flange 21c) that is formed at the lower end of the trunk portion 21a is in contact with the magnetic plate 25.

Bar-shaped coil terminals (not illustrated) are connected to the two ends of the electromagnetic coil 22, and the coil terminals are disposed in left and right connection holes 17 and 17 that are open to the front surface of the valve body 10.

Note that the member that is denoted by the reference sign 26 in FIG. 5 is a seal member that is disposed between the upper flange 21b and the upper surface wall 40, and the member that is denoted by the reference sign 27 in FIG. 5 is a seal member that is disposed between the lower flange 21c and the magnetic plate 25.

The stationary core 23 is made of a magnetic material such as iron so as to have an oval transverse cross-sectional shape and includes a core main body 23a that is fitted in the central hole 21d of the bobbin 21 and a flange portion 23b that is formed at an upper end of the core main body 23a. The stationary core 23 is fixedly attached to the bobbin 21 by fitting the flange portion 23b into a recess formed in an upper surface of the upper flange 21b of the bobbin 21 such that the flange portion 23b is sandwiched between the upper flange 21b and the upper surface wall 40 of the magnetic cover 20. In addition, the stationary core 23 and the magnetic cover 20 are magnetically coupled to each other by bringing the flange portion 23b into contact with the inner surface of the upper surface wall 40 of the magnetic cover 20.

Similar to the stationary core 23, the movable core 24 is made of a magnetic material such as iron so as to have an oval transverse cross-sectional shape and is fitted in the central hole 21d of the bobbin 21 so as to be capable of being freely displaced along the axis L. The movable core 24 extends through a central hole 25a of the magnetic plate 25 such that an end of the movable core 24 enters a core chamber 18 that is formed in the coupling portion 16 formed on the upper end portion of the valve body 10, and the push rods 15 are in contact with an end surface of the movable core 24. In addition, a cap 28 that is made of a synthetic resin and that forms a spring seat is fixed to an end portion of the movable core 24, and a core spring 29 that urges the movable core 24 in a direction away from the stationary core 23 (the downward direction in FIG. 5) is disposed between the cap 28 and the magnetic plate 25.

The upper end surface of the coupling portion 16 formed at the upper end of the valve body 10 is in contact with the lower surface of the magnetic plate 25 via a seal member 32. Coupling grooves 33 and 34 are respectively formed in the front surface and the rear surface of the coupling portion 16, and an engagement hook 45 that is formed on a lower end portion of a front surface wall 41 of the magnetic cover 20 and an engagement hook 46 that is formed on a lower end portion of a rear surface wall 42 of the magnetic cover 20 are folded and engaged into the coupling grooves 33 and 34, respectively.

Figure 6:
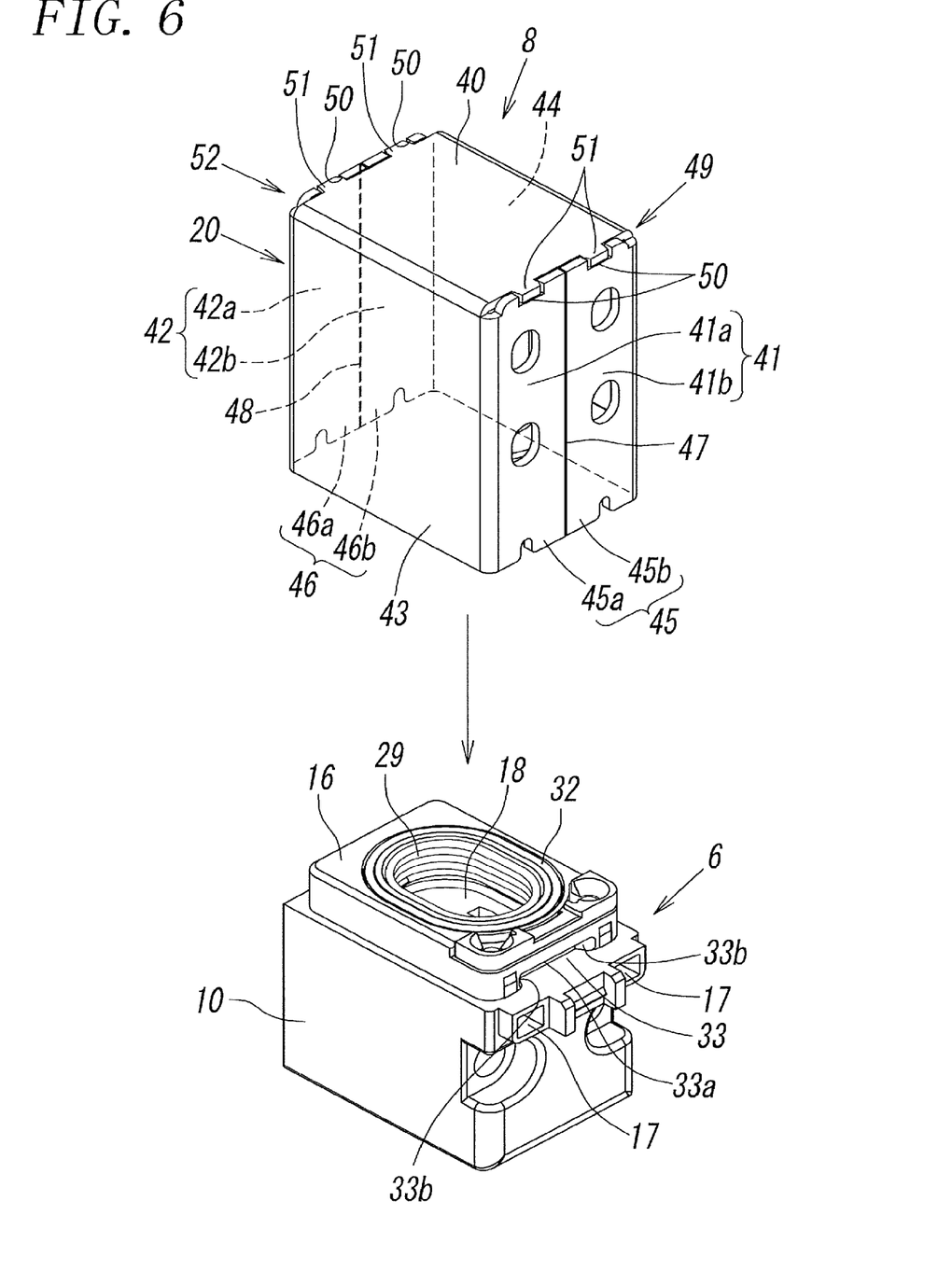
FIG. 6 is a perspective view illustrating the solenoid-valve main body separated into a main valve unit and an electromagnetic operation unit.
Figure 7:
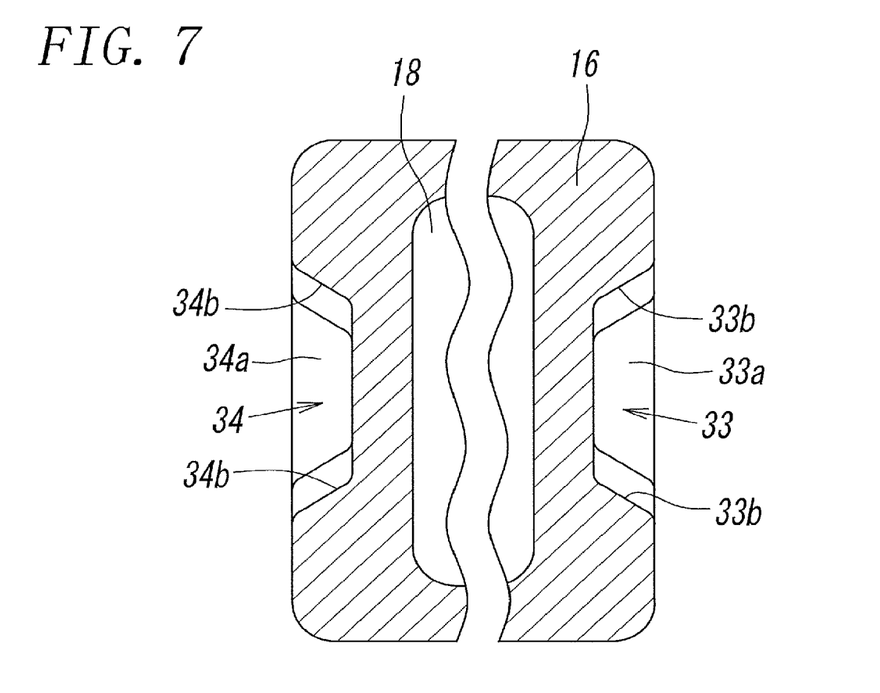
FIG. 7 is a cross-sectional view of a principal portion when a coupling portion of a valve body illustrated in FIG. 6 is cut horizontally at the position of a coupling groove and viewed upward.

As seen from FIG. 5 to FIG. 7, each of the coupling grooves 33 and 34 is an elongated groove extending in the transverse direction of the valve body 10, and the depth direction of the coupling grooves 33 and 34 is the same as the longitudinal direction of the valve body 10. The coupling groove 33 has an engagement wall 33a with which the engagement hook 45 engages and left and right side walls 33b and 33b with which the engagement hook 45 is brought into contact, and the coupling groove 34 has an engagement wall 34a with which the engagement hook 46 engages and left and right side walls 34b and 34b with which the engagement hook 46 is brought into contact. Each of the engagement walls 33a and 34a extends in the transverse direction of the valve body 10 and is gradually inclined in the depth direction of the coupling grooves 33 and 34 and in a direction away from the electromagnetic operation unit 8 (downward direction). The left and right side walls 33b and 33b are gradually inclined in the depth direction of the coupling groove 33 such that the gap between the left and right side walls 33b and 33b becomes narrower, and the left and right side walls 34b and 34b are gradually inclined in the depth direction of the coupling groove 34 such that the gap between the left and right side walls 34b and 34b becomes narrower.

As illustrated in detail in FIG. 3 to FIG. 6, the magnetic cover 20 is formed in a box shape by bending a single magnetic metal plate, which is made of iron or the like, and has the upper surface wall 40, the front surface wall 41, the rear surface wall 42, a left surface wall 43, and a right surface wall 44, the surface walls each having a rectangular shape. The lower surface of the magnetic cover 20 is open, and the coupling portion 16 formed on the upper end portion of the valve body 10 is fitted into the magnetic cover 20 through the lower surface.

The upper surface wall 40, the left surface wall 43, and the right surface wall 44 of the magnetic cover 20 are integrally formed so as to be contiguous to one another without any joint formed therebetween. In contrast, the front surface wall 41 is formed by bringing a first front-surface half wall 41a that has a rectangular shape and that is integrally and perpendicularly contiguous to the front end of the left surface wall 43 and a second front-surface half wall 41b that has a rectangular shape and that is integrally and perpendicularly contiguous to the front end of the right surface wall 44 into contact with each other at a front joint 47 that is located at the center of the front surface wall 41. In addition, the rear surface wall 42 is formed by bringing a first rear-surface half wall 42a that has a rectangular shape and that is integrally and perpendicularly contiguous to the rear end of the left surface wall 43 and a second rear-surface half wall 42b that has a rectangular shape and that is integrally and perpendicularly contiguous to the rear end of the right surface wall 44 into contact with each other at a rear joint 48 that is located at the center of the rear surface wall 42.

In order to prevent the first and second front-surface half walls 41a and 41b of the front surface wall 41 and the first and second rear-surface half walls 42a and 42b of the rear surface wall 42 from opening at their respective joints 47 and 48 or moving away from the front end portion or the rear end portion of the upper surface wall 40 due to springback of the bent metal plate in such a manner as to form a gap, at a front ridge portion 49 at which an upper end portion of the front surface wall 41 and a front end portion of the upper surface wall 40 are in contact with each other, two latch protrusions 51 that are formed on the front end portion of the upper surface wall 40 are latched in latch recesses 50 that are formed in an upper end portion of the first front-surface half wall 41a and an upper end portion of the second front-surface half wall 41b of the front surface wall 41, and similarly, at a rear ridge portion 52 at which an upper end portion of the rear surface wall 42 and a rear end portion of the upper surface wall 40 are in contact with each other, two latch protrusions 51 that are formed on the rear end portion of the upper surface wall 40 are latched in latch recesses 50 that are formed in an upper end portion of the first rear-surface half wall 42a and an upper end portion of the second rear-surface half wall 42b of the rear surface wall 42

The latch recesses 50 that are formed in the upper end portion of the first front-surface half wall 41a and the upper end portion of the second front-surface half wall 41b are arranged at positions that do not intersect the front joint 47 so as to be bilaterally symmetrical with respect to the front joint 47, and the latch recesses 50 that are formed in the upper end portion of the first rear-surface half wall 42a and the upper end portion of the second rear-surface half wall 42b are arranged at positions that do not intersect the rear joint 48 so as to be bilaterally symmetrical with respect to the rear joint 48.

In the lower end portion of the magnetic cover 20, as illustrated in FIG. 6, the engagement hook 45 is formed in a lower end portion of the front surface wall 41, and the engagement hook 46 is formed in a lower end portion of the rear surface wall 42.

The engagement hook 45 of the front surface wall 41 is formed of hook portions 45a and 45b that are respectively formed on a lower end portion of the first front-surface half wall 41a and a lower end portion of the second front-surface half wall 41b, and the hook portions 45a and 45b are contiguous to each other via the front joint 47.

Similarly, the engagement hook 46 of the rear surface wall 42 is formed of hook portions 46a and 46b that are respectively formed on a lower end portion of the first rear-surface half wall 42a and a lower end portion of the second rear-surface half wall 42b, and the hook portions 46a and 46b are contiguous to each other via the rear joint 48.

Note that each of the engagement hooks 45 and 46 illustrated in FIG. 6 has not yet been deformed (bent) and extends linearly downward.

In addition, in FIG. 6, illustration of the bobbin 21, the stationary core 23, the movable core 24, the magnetic plate 25, and so forth in the magnetic cover 20 by using dotted lines is omitted.

As illustrated in FIG. 5, the engagement hooks 45 and 46 are respectively folded into the coupling grooves 33 and 34, which are formed in the front surface and the rear surface of the coupling portion 16 of the valve body 10, so as to engage with the engagement walls 33a and 34a, respectively, so that the magnetic cover 20 (the electromagnetic operation unit 8) and the valve body 10 are coupled to each other.

Note that the engagement wall 33a of the coupling groove 33 extends in the transverse direction of the valve body 10 across the joint 47, and the engagement wall 34a of the coupling groove 34 extends in the transverse direction of the valve body 10 across the joint 48.

Here, in the front surface wall 41, when the engagement hook 45 is folded into the coupling groove 33 formed in the front surface, a left-side end portion of the hook portion 45a of the first front-surface half wall 41a is brought into contact with the left side wall 33b of the coupling groove 33 and pressed toward the second front-surface half wall 41b, and a right-side end portion of the hook portion 45b of the second front-surface half wall 41b is brought into contact with the right side wall 33b of the coupling groove 33 and pressed toward the first front-surface half wall 41a. Thus, the first front-surface half wall 41a and the second front-surface half wall 41b are pressed in a direction in which the front joint 47 is closed, and as a result, the front joint 47 is reliably prevented from opening.

Similarly, in the rear surface wall 42, when the engagement hook 46 is folded into the coupling groove 34 formed in the rear surface, a right-side end portion of the hook portion 46a of the first rear-surface half wall 42a is brought into contact with the right side wall 34b of the coupling groove 34 and pressed toward the second rear-surface half wall 42b, and a left-side end portion of the hook portion 46b of the second rear-surface half wall 42b is brought into contact with the left side wall 34b of the coupling groove 34 and pressed toward the first rear-surface half wall 42a. Thus, the first rear-surface half wall 42a and the second rear-surface half wall 42b are pressed in a direction in which the front joint 48 is closed, and as a result, the front joint 48 is reliably prevented from opening.

The magnetic cover 20 is formed in a box shape in the manner described above and is coupled to the valve body 10, and thus, even though the magnetic cover 20 is formed by bending a metal plate, springback of the metal plate is suppressed with certainty. Consequently, formation of a gap as a result of the front joint 47 between the first front-surface half wall 41a and the second front-surface half wall 41b or the rear joint 48 between the first rear-surface half wall 42a and the second rear-surface half wall 42b being opened or as a result of a portion where the front surface wall 41 and the upper surface wall 40 are in contact with each other being opened at the front ridge portion 49 or a portion where the rear surface wall 42 and the upper surface wall 40 are in contact with each other being opened at the rear ridge portion 52 is prevented, so that a stable box shape can be maintained. In addition, since the magnetic cover 20 is formed by performing bending, scratches such as those formed when deep drawing is performed will not be formed on its surfaces, and thus, the magnetic cover 20 can be finished so as to have a beautiful appearance.

In addition, the magnetic cover 20 forms a portion of a magnetic circuit for guiding a magnetic flux that is generated when the electromagnetic coil 22 is energized to the stationary core 23 and the movable core 24, and thus, if the magnetic cover 20 has a gap such as that mentioned above, the magnetic reluctance increases in the gap portion, so that the magnetic efficiency decreases. However, as described above, since the magnetic cover 20 has a structure with which a gap is less likely to be formed, a decrease in the magnetic efficiency is less likely to occur.

As illustrated in FIG. 1 and FIG. 2, in the front surface wall 41 of the magnetic cover 20, two vertically-long attachment holes 53 are formed in the first front-surface half wall 41a, and two vertically-long attachment holes 53 are formed in the second front-surface half wall 41b. Each of the vertically-long attachment holes 53 is used for attaching a substrate support 56 of the electric connecting unit 3, and the electric connecting unit 3 is attached to the solenoid-valve main body 2 in the following manner by using the attachment holes 53.

In other words, the electric connecting unit 3 includes the substrate support 56, a terminal substrate 57 supported on the substrate support 56, and a terminal cover 58 that covers the substrate support 56 and the terminal substrate 57.

The substrate support 56 is a member having a rectangular dish-like shape and has a front surface that is recessed and a rear surface on which hook-shaped protrusions 59 are formed, two of the hook-shaped protrusions 59 being formed on the left-hand side, and the other two of the hook-shaped protrusions 59 being formed on the right-hand side.

The substrate support 56 further includes an elastic engagement piece 60 that is formed on a lower end portion thereof, two latch protrusions 61 that are formed on the left side surface thereof, and two latch protrusions 61 that are formed on the right side surface thereof. The hook-shaped protrusions 59 are inserted and hooked into the four attachment holes 53 of the front surface wall 41 of the magnetic cover 20, and the elastic engagement piece 60 elastically engages with an engagement portion 62 that is formed on the front surface of the valve body 10, so that the substrate support 56 is attached to the solenoid-valve main body 2.

The terminal substrate 57 includes a left-and-right pair of clip terminals 64 (only one of them is illustrated in FIG. 2) that extend from a lower end portion of the terminal substrate 57 toward the side on which the rear surface of the terminal substrate 57 is present and a left-and-right pair of connection terminals 4 and 4 that project toward the side on which the front surface of the terminal substrate 57 is present, and each of the connection terminals 4 and 4 is connected to a corresponding one of the pair of clip terminals 64 by a printed wiring line 66 that is formed on the terminal substrate 57. The terminal substrate 57 is supported on the substrate support 56 so as to be positioned by positioning protrusions 67, so that the clip terminals 64 and 64 are connected to the coil terminals, which are disposed in the connection holes 17 and 17 formed in the front surface of the valve body 10, via the connection holes 17 and 17.

The terminal cover 58 has latch holes 68, two of which are formed on the left side surface thereof and the other two of which are formed on the right side surface thereof, and a connector socket 69 that is formed in a lower portion of the front surface thereof. The latch protrusions 61 of the substrate support 56 are latched into the latch holes 68, so that the terminal cover 58 is joined to the substrate support 56 in such a manner as to cover the substrate support 56 and the terminal substrate 57. In this case, the pair of connection terminals 4 and 4 are accommodated in the connector socket 69.

The solenoid valve 1 is configured as described above, and when the solenoid valve 1 is used, a connector that is formed at an end of the lead wire, which is connected to the control device, is inserted into the connector socket 69 of the terminal cover 58 such that the connector is connected to the connection terminals 4 and 4. By starting and stopping energization of the electromagnetic coil 22 of the electromagnetic operation unit 8, the valve member 7 is caused to switch the flow path, and the operation is as follows.

FIG. 5 illustrates an operating state when the electromagnetic coil 22 is not energized. In this case, the movable core 24 is pushed down by a force of the core spring 29, and thus, the valve member 7 is also pushed down by the movable core 24 via the push rods 15, so that the valve member 7 opens the discharge opening Eo and closes the input opening Po. Consequently, the input port P is blocked, and the output port A and the discharge port E communicate with each other.

In this state, when the electromagnetic coil 22 is energized, the movable core 24 is attracted to the stationary core 23 and moves upward by the magnetic force generated by the stationary core 23, and thus, the pushing-down force applied to the valve member 7 via the push rods 15 is released. Thus, the valve member 7 is pushed up by an urging force of the valve spring 14, and the valve member 7 opens the input opening Po and closes the discharge opening Eo. As a result, the input port P and the output port A communicate with each other, and the discharge port E is blocked.

Figure 8:
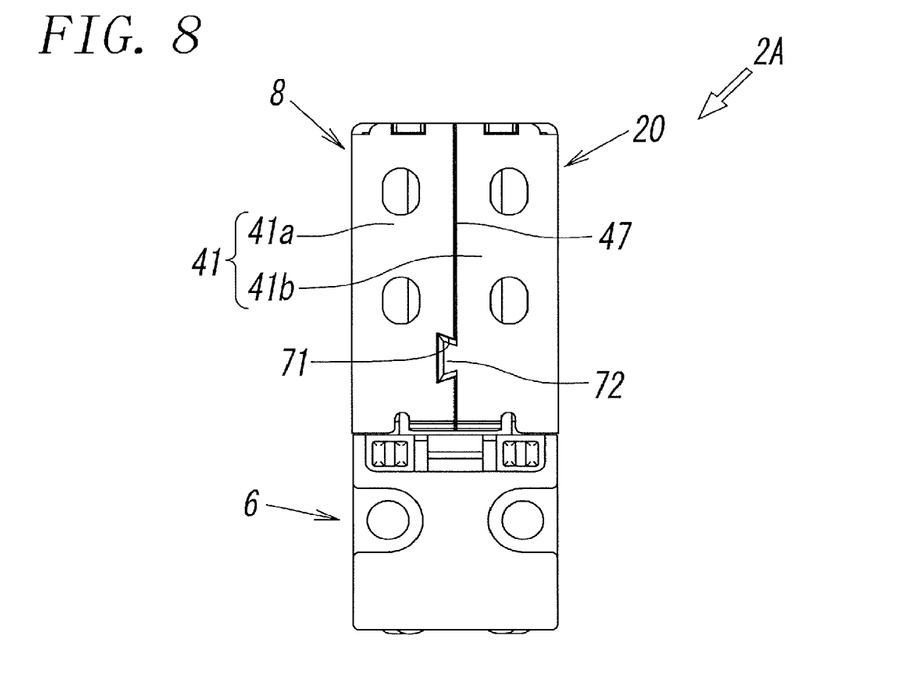
FIG. 8 is a front view illustrating a second embodiment of a solenoid valve according to the present invention.
Figure 9:
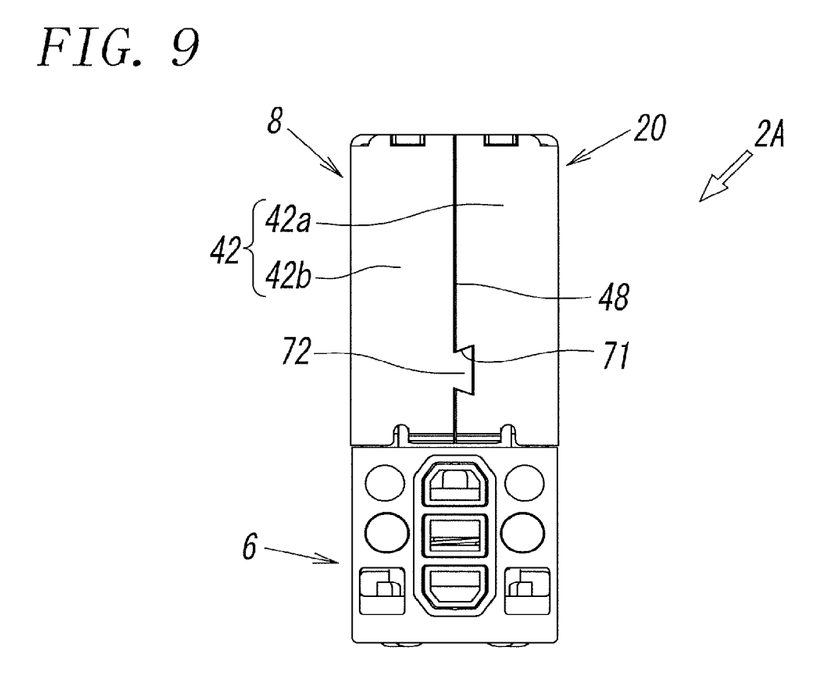
FIG. 9 is a rear view of FIG. 8.

FIG. 8 and FIG. 9 each illustrate a solenoid-valve main body 2A of a solenoid valve of a second embodiment. The solenoid-valve main body 2A is different from the solenoid-valve main body 2 of the solenoid valve 1 of the above-described first embodiment in that the first front-surface half wall 41a and the second front-surface half wall 41b, which form the front surface wall 41 of the magnetic cover 20, are coupled to each other at the joint 47 by engaging a dovetail 72 formed on one of the front-surface half walls into a dovetail groove 71 formed in the other of the front-surface half walls and in that the first rear-surface half wall 42a and the second rear-surface half wall 42b, which form the rear surface wall 42 of the magnetic cover 20, are coupled to each other at the joint 48 by engaging a dovetail 72 formed on one of the rear-surface half walls into a dovetail groove 71 formed in the other of the rear-surface half walls.

The rest of the configuration of the solenoid-valve main body 2A is substantially the same as the configuration of the solenoid-valve main body 2 of the above-described first embodiment, and thus, principal components that are the same as those of the solenoid-valve main body 2 are denoted by the same reference signs used for describing the solenoid-valve main body 2, and the descriptions thereof will be omitted.

Note that, in the solenoid-valve main body 2A illustrated in FIG. 8 and FIG. 9, the dovetail groove 71 is formed in each of the first front-surface half wall 41a and the first rear-surface half wall 42a, and the dovetail 72 is formed on each of the second front-surface half wall 41b and the second rear-surface half wall 42b. However, contrary to this, the dovetail 72 may be formed on each of the first front-surface half wall 41a and the first rear-surface half wall 42a, and the dovetail groove 71 may be formed in each of the second front-surface half wall 41b and the second rear-surface half wall 42b.

In addition, in the above-described embodiments, in order to engage the front surface wall 41 and the rear surface wall 42 with the upper surface wall 40, the latch recesses 50 are formed in the first front-surface half wall 41a and the second front-surface half wall 41b of the front surface wall 41 and the first rear-surface half wall 42a and the second rear-surface half wall 42b of the rear surface wall 42, and the latch protrusions 51 are formed on the front end portion and the rear end portion of the upper surface wall 40. However, contrary to this, the latch protrusions 51 may be formed on the first front-surface half wall 41a and the second front-surface half wall 41b of the front surface wall 41 and the first rear-surface half wall 42a and the second rear-surface half wall 42b of the rear surface wall 42, and the latch recesses 50 may be formed in the front end portion and the rear end portion of the upper surface wall 40.

Furthermore, although the solenoid valve of each of the above-described embodiments is a poppet-type solenoid valve that opens and closes the input opening Po and the discharge opening Eo as a result of the valve member 7 displacing in the vertical direction with respect to the input opening Po and the discharge opening Eo, the solenoid valve of the present invention may be a spool valve that opens and closes a flow path by using a spool that slides in a valve hole.

In addition, the present invention can be applied not only to a three-port valve, which is illustrated in the drawings, but also to a two-port valve, a four-port valve, or a five-port valve.

REFERENCE SIGNS LIST 1 solenoid valve
6 main valve unit
7 valve member
8 electromagnetic operation unit
10 valve body
16 coupling portion
20 magnetic cover
33, 34 coupling groove
33a, 34a engagement wall
33b, 34b side wall
40 upper surface wall
41 front surface wall
41a first front-surface half wall
41b second front-surface half wall
42 rear surface wall
42a first rear-surface half wall
42b second rear-surface half wall
43 left surface wall
44 right surface wall
45a, 45b, 46a, 46b hook portion
47, 48 joint
49 front ridge portion
50 latch recess
51 latch protrusion
52 rear ridge portion
72 dovetail groove
72 dovetail

The invention claimed is:

1. A solenoid valve formed by coupling a main valve unit that includes a valve member movable to open and close a flow path and an electromagnetic operation unit that causes, by using an electromagnetic force, the valve member to perform opening and closing operations to each other,
wherein the main valve unit includes a valve body in which the valve member is disposed, and the valve body includes a coupling portion for coupling the electromagnetic operation unit, the coupling portion having a front surface in which a coupling groove is formed and a rear surface in which a coupling groove is formed,
wherein the electromagnetic operation unit includes a magnetic cover that has a quadrangular box shape and that covers the electromagnetic operation unit,
wherein the magnetic cover has a rectangular upper surface wall, a rectangular front surface wall, a rectangular rear surface wall, a rectangular left surface wall, and a rectangular right surface wall, and the upper surface wall, the front surface wall, the rear surface wall, the left surface wall, and the right surface wall are integrally formed by bending a single metal plate,
wherein a lower surface of the magnetic cover is open, and the coupling portion of the valve body is fitted into the magnetic cover through the lower surface,
wherein the front surface wall of the magnetic cover is formed by bringing a rectangular first front-surface half wall that is integrally contiguous to a front end of the left surface wall and a rectangular second front-surface half wall that is integrally contiguous to a front end of the right surface wall into contact with each other at a joint, and the rear surface wall is formed by bringing a rectangular first rear-surface half wall that is integrally contiguous to a rear end of the left surface wall and a rectangular second rear-surface half wall that is integrally contiguous to a rear end of the right surface wall into contact with each other at a joint, wherein latch recesses or latch protrusions that are formed in or on an upper end portion of the first front-surface half wall and an upper end portion of the second front-surface half wall and latch protrusions or latch recesses that are formed on or in a front end portion of the upper surface wall are latched together at a front ridge portion at which the upper surface wall and the front surface wall are in contact with each other, and latch recesses or latch protrusions that are formed in or on an upper end portion of the first rear-surface half wall and an upper end portion of the second rear-surface half wall and latch protrusions or latch recesses that are formed on or in a rear end portion of the upper surface wall are latched together at a rear ridge portion at which the upper surface wall and the rear surface wall are in contact with each other, and wherein, in a lower end portion of the magnetic cover, hook portions for engagement are formed on a lower end portion of the first front-surface half wall and a lower end portion of the second front-surface half wall of the front surface wall in such a manner as to be contiguous to each other via the corresponding joint, and hook portions for engagement are formed on a lower end portion of the first rear-surface half wall and a lower end portion of the second rear-surface half wall of the rear surface wall in such a manner as to be contiguous to each other via the corresponding joint, and wherein the hook portions are folded and engaged into the coupling grooves formed in the coupling portion of the valve body such that the main valve unit and the electromagnetic operation unit are coupled to each other.

2. The solenoid valve according to claim 1,
wherein the coupling groove formed in the front surface of the coupling portion of the valve body has an engagement wall extending in a transverse direction of the valve body across the joint of the front surface wall and left and right side walls, and the coupling groove formed in the rear surface of the coupling portion of the valve body has an engagement wall extending in the transverse direction of the valve body across the joint of the rear surface wall and left and right side walls, the left and right side walls of each of the coupling grooves being gradually inclined in a depth direction the coupling groove and in a direction in which a gap between the left and right side walls becomes narrower, wherein the magnetic cover and the valve body are coupled to each other by engaging the hook portions with the engagement walls of the coupling grooves, wherein the hook portions of the first front-surface half wall and the second front-surface half wall are brought into contact with the left and right side walls of the coupling groove of the front surface, so that the first front-surface half wall and the second front-surface half wall are pressed in a direction in which the corresponding joint is closed, and the hook portions of the first rear-surface half wall and the second rear-surface half wall are brought into contact with the left and right side walls of the coupling groove of the rear surface, so that the first rear-surface half wall and the second rear-surface half wall are pressed in a direction in which the corresponding joint is closed.

3. The solenoid valve according to claim 1,
wherein the latch recesses are formed in the upper end portion of the first front-surface half wall, the upper end portion of the second front-surface half wall, the upper end portion of the first rear-surface half wall, and the upper end portion of the second rear-surface half wall in such a manner that the latch recesses formed in the first front-surface half wall and the second front-surface half wall are arranged at positions that do not intersect the corresponding joint and that the latch recesses formed in the first rear-surface half wall and the second rear-surface half wall are arranged at positions that do not intersect the corresponding joint, and the latch protrusions are formed on the front end portion and the rear end portion of the upper surface wall.

4. The solenoid valve according to claim 1,
wherein the first front-surface half wall and the second front-surface half wall forming the front surface wall of the magnetic cover are coupled to each other at the corresponding joint by engaging a dovetail formed on one of the front-surface half walls and a dovetail groove formed in another one of the front-surface half walls with each other, and the first rear-surface half wall and the second rear-surface half wall forming the rear surface wall of the magnetic cover are coupled to each other at the corresponding joint by engaging a dovetail formed on one of the rear-surface half walls and a dovetail groove formed in another one of the rear-surface half walls with each other.

\* \* \* \* \*